(12) United States Patent
Onslow

(10) Patent No.: US 8,174,397 B2
(45) Date of Patent: May 8, 2012

(54) MULTI FUNCTIONAL MONITOR

(76) Inventor: Leigh Melanie Onslow, Leicester (GB)

(*) Notice: Subject to any disclaimer, the term of this patent is extended or adjusted under 35 U.S.C. 154(b) by 0 days.

(21) Appl. No.: 12/917,413

(22) Filed: Nov. 1, 2010

(65) Prior Publication Data

US 2011/0121981 A1  May 26, 2011

(30) Foreign Application Priority Data

Nov. 2, 2009 (GB) .................................. 0919158.6

(51) Int. Cl.
*G08B 21/00* (2006.01)
(52) U.S. Cl. ................. 340/602; 340/539.28; 340/572.1
(58) Field of Classification Search .................. 340/602, 340/596, 601, 588, 572.9, 572.8, 572.1, 539.28, 340/525, 527
See application file for complete search history.

(56) References Cited

U.S. PATENT DOCUMENTS

| | | | | |
|---|---|---|---|---|
| 5,774,999 | A * | 7/1998 | Smith | 33/555.4 |
| 7,684,894 | B2 * | 3/2010 | Sakai et al. | 700/245 |
| 2002/0195282 | A1 * | 12/2002 | Thadani | 177/148 |
| 2003/0185706 | A1 * | 10/2003 | Ribi | 422/58 |
| 2005/0049940 | A1 * | 3/2005 | Tengler et al. | 705/27 |
| 2005/0241172 | A1 * | 11/2005 | Holland | 33/760 |

FOREIGN PATENT DOCUMENTS

| | | |
|---|---|---|
| DE | 3210287 A1 | 9/1983 |
| GB | 2146623 A | 4/1985 |
| JP | 52151045 U | 11/1977 |
| JP | 55046219 U1 | 3/1980 |
| JP | 5260851 A | 10/1993 |
| WO | 8503121 A1 | 7/1985 |
| WO | 2010129168 A2 | 11/2010 |

OTHER PUBLICATIONS

International Search Report dated Feb. 23, 2011 for Application No. GB1018373.9.

* cited by examiner

Primary Examiner — Daniel Previl
(74) Attorney, Agent, or Firm — Young Basile

(57) ABSTRACT

A multi function monitor for monitoring environmental conditions and events, the monitor comprising: a monitor panel having a plurality of monitors thereon; and a measuring device attachable at either end of the monitor panel for measuring the circumference of an object around which it is placed. The monitor panel includes: a temperature detection and display device; an ultraviolet radiation detection and display device; and a humidity detection and display device.

17 Claims, 1 Drawing Sheet

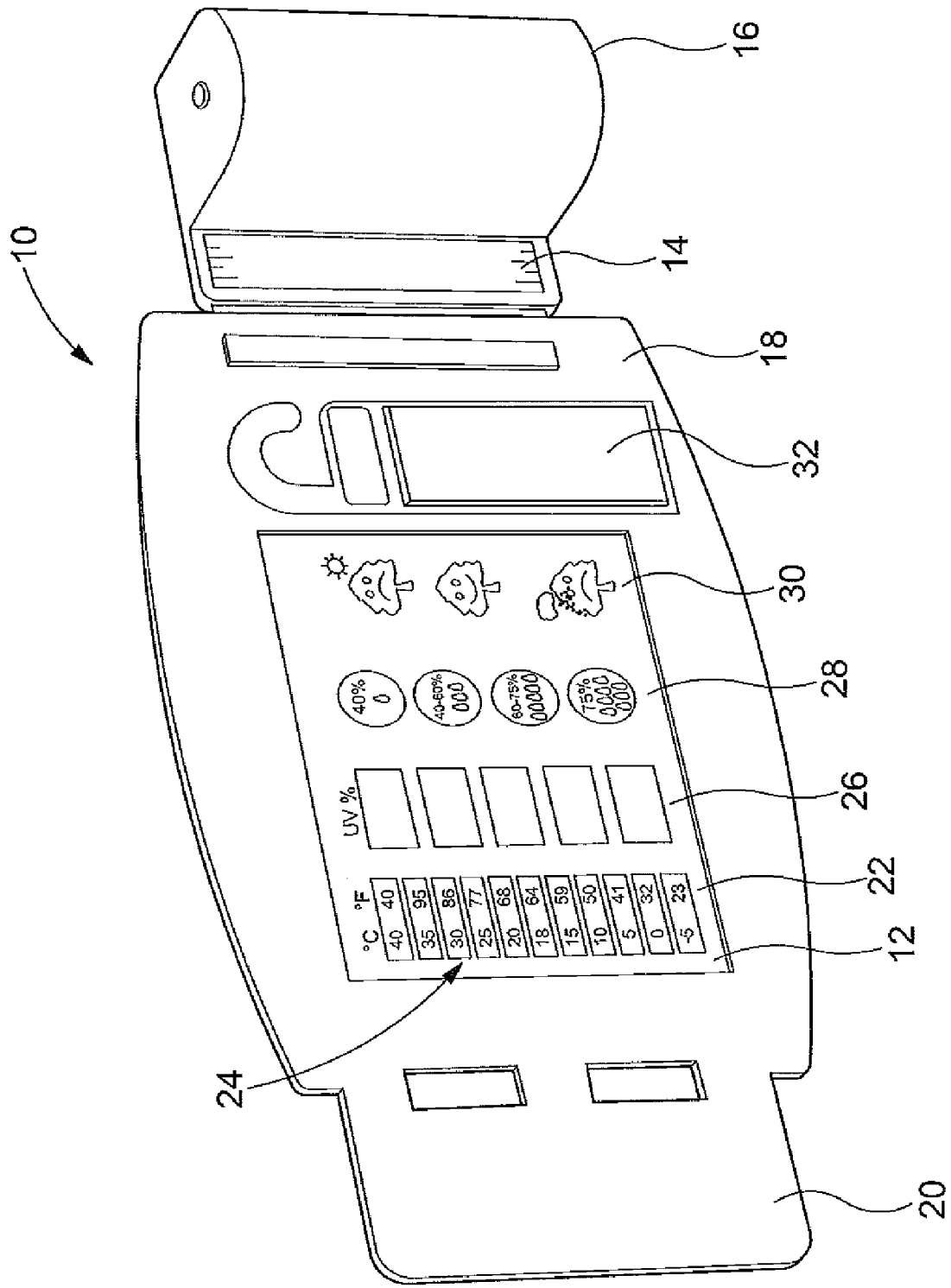

MULTI FUNCTIONAL MONITOR

FIELD OF THE INVENTION

The present invention relates to a multi-function monitor, in particular to a multi function monitor for measuring conditions that effect the healthy growth of plants.

BACKGROUND

Various devices for measuring environmental conditions such as temperature, humidity, and UV exposure are well used and are commonly used, for example in weather forecasting.

People are becoming increasingly aware of the ongoing effects that the environment has on our health and on the health of flora and fauna and in education teachers endeavor to promote an interest in the environment. Educational projects looking at the environment are commonplace and may require students to correlate environmental conditions with requirements.

Monitoring equipment for monitoring environmental parameters is traditionally expensive and in some instances complex to use which limits the age range at which it can be beneficial. In light of this many school projects will rely on available data which will not necessarily correlate to their exact location and removes the student from the process.

It is the purpose of the present invention to provide a multi function monitor that mitigates some of the above issues.

According to the invention there is provided a multi function monitor for monitoring environmental conditions and events, the monitor comprising: a monitor panel having a plurality of monitors thereon; and a measuring device attachable at either end of the monitor panel for measuring the circumference of an object around which it is placed; wherein the monitor panel includes: a temperature detection and display device; an ultraviolet radiation detection and display device; and a humidity detection and display device.

Preferably the measuring device also functions as an attachment means by which the monitor can be attached around an object.

The monitor may further comprise a monitoring device for monitoring and displaying environmental conditions in relation to optimal environmental conditions for the health of a particular plant or tree, the monitoring and display device comprising: a plurality of reactive zones, each reactive zone comprising a plurality of reactive sections, a section of each of the reactive zones responsive to a common environmental condition, wherein the sections of each of the reactive zones responsive to a common environmental condition are reactive to detect and indicate a different magnitude of the particular environmental condition.

The plurality of reactive sections are preferably reactive to change color in response to a particular magnitude of the particular environmental condition they are responsive to.

The reactive sections of a first of said plurality reactive zones are reactive to environmental conditions below optimal conditions for the health of the particular plant or tree; the reactive sections of a second of said plurality reactive zones are reactive to environmental conditions above optimal conditions for the health of the particular plant or tree; and the reactive sections of a first of said plurality reactive zones are reactive to substantially optimal environmental conditions for the health of the particular plant or tree.

In a preferred embodiment the temperature detection and display device comprises a plurality of thermochromic reactive zones. Each zone can contain a different composition of thermochromic ink such that each zone changes color at a different temperature.

The ultraviolet radiation detection and display device may comprise a plurality of reactive zones that change color in response to a particular ultraviolet radiation level and the humidity detection and display device comprises a plurality of hydrochromic reactive zones.

Preferably the color change of any of the reactive areas is reversible. Alternatively, the ultraviolet exposure monitor can be cumulative.

Preferably the monitor further comprises a container with a foldable lid for containing a sample of the plant being monitored. For example, a sample of the leaf at different parts of the seasonal cycle, an example of the pollen or flower may be recorded and kept in the container.

The measuring device is preferably a spring loaded measuring tape that is biased into a retracted position.

Specific embodiments of the invention will now be described, with reference to the drawing.

SUMMARY

The foregoing invention discloses a low cost monitor that can be used for education purposes to understand and teach how different environmental conditions can affect plant growth. The monitor also enables the study and teaching of how the environmental conditions affect the growth of a plant throughout the seasons. The invention enables all the above in a device that can be produced at relatively low cost thereby enabling such study to be available on a low budget.

BRIEF DESCRIPTION OF THE DRAWINGS

In order to further describe the invention as claimed, the description herein makes reference to the accompanying non-limitative drawing in which like reference numbers refer to like parts throughout the several views and wherein:

FIG. 1 is a depiction of an embodiment of a monitor as disclosed herein.

DETAILED DESCRIPTION

The monitor 10 comprises a plastic molding having an information area 12 thereon. The molding 10 has a linear measuring aid attached thereto which comprises a flexible measuring tape 14 encased within a spring-loaded cartridge 16. The measuring tape 14 is attached to one end 18 of the plastic molding and can be extended therefrom and around an object to be measured, for example a tree. The cartridge 16 is then attached to the opposite side 20 of the monitor 10 and the circumference of the object can therefore be measured. In this manner the growth, for example the expansion of the diameter of a tree, can be monitored and read from the multi purpose monitor.

The display area 12 has four discreet monitoring areas. The first monitoring area comprises a temperature indicator 22 which shows an average temperature both in degrees Celsius and degrees Fahrenheit, although, of course, only one of these temperature indicative numbers contains, or has printed thereon, the thermochromic material or ink 24. The thermochromic ink behind each separate temperature is of a different formulation such that only the thermochromic ink relating to a single temperature changes color at any specific time. For example, the display could be substantially black with white numbers thereon and the color behind the current temperature may change color to, for example, red yellow or green so as to indicate the current temperature.

Adjacent the temperature monitor are a plurality of areas 26 that are responsive to different levels of ultraviolet radiation. Different areas 26 may change color to indicate the current level of radiation or, over time, an increasing number of the areas could change color so as to indicate the total cumulative ultraviolet exposure.

The sensor area also contains a number of areas 28 that change color in response to differing levels of humidity. These areas have the humidity, or humidity band, at which they change color written thereon. For example, the humidity bands could be up to 40%, 40-60%, 60-75% or 75%+humidity. The areas 28 may contain or have printed thereon a hydrochromic ink or dye that changes temperature in response to the humidity.

The monitor also has a final column 30 containing a plurality of zones each indicative of the overall conditions that the plant or tree is experiencing. The different zones each contain one or more different sections that are responsive to the different environmental conditions being monitored. For example, a single zone can contain a section of that area that is responsive to temperature, a section that is responsive to ultraviolet radiation and a section which is responsive to humidity.

Of these different zones the responsive sections of one zone are responsive to conditions above optimal conditions, the responsive sections of a second zone are responsive to conditions below optimal conditions and the sections of a third zone are responsive to optimal growing conditions. In this way, if all the sections have changed color in a zone responsive to optimal growing conditions it can be known that the plant or tree is experiencing optimal growing conditions. If all the sections of a different zone or different sections of different zones have changed color then it is known that optimal growing conditions have not been achieved. In some applications, for example where the plant or tree is being grown in an environmentally tailored area the growing conditions can then be modified so as to achieve optimal growing conditions for the plant or tree.

The monitor also has an openable container 32 attached thereto in which samples of the plant or tree can be placed. For example, a sample of pollen, a flower or a leaf or seed of the plant may be placed in the container 32 to record the current state of the plant or tree as it changes through the seasons. This container is preferably removable from the monitor 10 and has a clear front so that the contents of the container can be scrutinized therethrough.

Changes or additions to the invention as disclosed herein, for example the use of different technologies for the monitoring and display of the various environmental conditions will be apparent to the skilled person and deemed within the scope of the invention which is defined by the claims.

While preferred embodiments, forms and arrangements of parts of the invention have been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. A multi function monitoring for monitoring environmental conditions and events, the monitor comprising:
    a monitor panel having a plurality of monitors thereon; and
    a measuring device configured to be placed around an object, the measuring device attachable at either end of the monitor panel for measuring the circumference of the object;
    wherein the monitor panel includes: a temperature detection and display device; an ultraviolet radiation detection and display device; and a humidity detection and display device, wherein
    the monitor panel having a plurality of reactive zones, each reactive zone comprising a plurality of reactive sections, each section of each of the reactive zones responsive to a common environmental condition, wherein the sections of each of the reactive zones are reactive to detect and indicate a different magnitude of their particular monitored environmental condition.

2. The monitor of claim 1 wherein the measuring device also functions as an attachment means by which the monitor can be attached around an object.

3. The monitor of claim 2 wherein said optimal environmental conditions are optimal conditions for the health of a particular plant or tree.

4. The monitor of claim 1 wherein the device is configured to monitor and display environmental conditions in relation to optimal environmental conditions.

5. The monitor of claim 4 wherein the measuring device also functions as an attachment means by which the monitor can be attached around an object.

6. The monitor of claim 4 wherein the plurality of reactive sections are reactive to change color in response to a particular magnitude of the particular environmental condition they are responsive to.

7. The monitor of claim 4 wherein the reactive sections of a first of said plurality of reactive zones are reactive to environmental conditions below optimal conditions for the health of the particular plant or tree; the reactive sections of a second of said plurality of reactive zones are reactive to environmental conditions above optimal conditions for the health of the particular plant or tree; and the reactive sections of a first of said plurality of reactive zones are reactive to substantially optimal environmental conditions for the health of the particular plant or tree.

8. The monitor according to claim 1 wherein the temperature detection and display device comprises a plurality of thermochromic reactive zones.

9. The monitor according to claim 1 wherein the ultraviolet radiation detection and display device comprises a plurality of reactive zones that change color in response to a particular ultraviolet radiation level.

10. The monitor according to claim 1 wherein the humidity detection and display device comprises a plurality of hydrochromic reactive zones.

11. The monitor according to claim 1 wherein the color change of any of the reactive areas is reversible.

12. The monitor according to claim 1 further comprising a container with a foldable lid for containing a sample of the plant being monitored.

13. The monitor according to claim 1 wherein the measuring device comprises a spring loaded measuring tape that is biased into a retracted position.

14. A multi function monitor for monitoring environmental conditions and events, the monitor comprising:
    a monitor panel having a plurality of monitors thereon; and
    a measuring device configured to be placed around an object, the measuring device, the measuring device comprising a spring loaded measuring tape that is biased into a retracted position and attachable at either end of the monitor panel for measuring the circumference of and attaching the monitor to the object;

wherein the monitor panel includes: a temperature detection and display device comprising a plurality of thermochromic reactive zones; an ultraviolet radiation detection and display device comprising a plurality of reactive zones, wherein said reactive zones change color in response to a particular ultraviolet radiation level; and a humidity detection and display device comprising a plurality of hydrochromic reactive; and wherein the color change of any of the reactive areas is reversible.

15. The monitor of claim 14 further comprising a monitor for monitoring and displaying environmental conditions in relation to optimal environmental conditions for the health of a particular plant or tree, the monitoring and display device comprising:

a plurality of reactive zones, each reactive zone comprising one or more reactive sections responsive to a different environmental condition.

16. The monitor of claim 14 wherein the reactive sections of a first of said plurality of reactive zones are reactive to environmental conditions below optimal conditions for the health of the particular plant or tree; the reactive sections of a second of said plurality of reactive zones are reactive to environmental conditions above optimal conditions for the health of the particular plant or tree; and the reactive sections of a third of said plurality of reactive zones are reactive to substantially optimal environmental conditions for the health of the particular plant or tree.

17. A multi function monitor for monitoring environmental conditions and events, the monitor comprising:

a monitor panel having a plurality of monitors thereon; and a measuring device configured to be placed around an object, the measuring device comprising a spring loaded measuring tape that is biased into a retracted position and attachable at either end of the monitor panel for measuring the circumference of and attaching the monitor to the object;

wherein the monitor panel includes: a temperature detection and display device comprising a plurality of thermochromic reactive zones; an ultraviolet radiation detection and display device comprising a plurality of reactive zones configured change color in response to a particular ultraviolet radiation level; and a humidity detection and display device comprising a plurality of hydrochromic reactive zones; a monitor and display device for monitoring and displaying environmental conditions in relation to optimal environmental conditions, the monitoring and display device comprising: a plurality of reactive zones, each reactive zone comprising one or more sections responsive to a different environmental condition and; wherein the color change of any of the reactive areas is reversible and;

wherein the reactive sections of a first of said plurality of reactive zones are reactive to environmental conditions below optimal the reactive sections of a second of said plurality of reactive zones are reactive to environmental conditions above optimal conditions; and the reactive sections of a third of said plurality of reactive zones are reactive to substantially optimal environmental conditions.

* * * * *